(12) United States Patent
Leuenberger et al.

(10) Patent No.: US 11,485,291 B2
(45) Date of Patent: Nov. 1, 2022

(54) ASSEMBLY FOR MOUNTING A MOBILE TERMINAL, AND VEHICLE COMPRISING SUCH A MOUNTING ASSEMBLY

(71) Applicant: VOLKSWAGEN AKTIENGESELLSCHAFT, Wolfsburg (DE)

(72) Inventors: Joern Leuenberger, Braunschweig (DE); Peter Christian Huebner, Boizenburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 46 days.

(21) Appl. No.: 16/938,073

(22) Filed: Jul. 24, 2020

(65) Prior Publication Data

US 2020/0353871 A1 Nov. 12, 2020

Related U.S. Application Data

(63) Continuation of application No. PCT/EP2019/050379, filed on Jan. 9, 2019.

(30) Foreign Application Priority Data

Jan. 24, 2018 (DE) ...................... 10 2018 201 123.0

(51) Int. Cl.
*B60R 7/04* (2006.01)
*H04B 1/3822* (2015.01)
*B60R 11/00* (2006.01)

(52) U.S. Cl.
CPC .............. *B60R 7/04* (2013.01); *H04B 1/3822* (2013.01); *B60R 2011/0007* (2013.01); *B60R 2011/0075* (2013.01)

(58) Field of Classification Search
CPC .............. B60R 7/04; B60R 2011/0007; B60R 2011/0075; H04B 1/3822
(Continued)

(56) References Cited

U.S. PATENT DOCUMENTS 5,179,447 A * 1/1993 Lain ....................... A47C 7/723
348/827
7,399,033 B2 * 7/2008 Hsiao .................. B60R 11/0235
248/921

(Continued)

FOREIGN PATENT DOCUMENTS

DE 202007012617 U1 12/2007
DE 202011105255 U1 12/2011
(Continued)

*Primary Examiner* — Peter N Helvey
(74) *Attorney, Agent, or Firm* — Muncy, Geissler, Olds & Lowe, P.C.

(57) ABSTRACT

An assembly for mounting a mobile terminal in or on a vehicle, having a mounting console which has a receiving portion for the mobile terminal. The receiving portion has a support surface for the mobile terminal starting from a vertical and being arranged in an inclined manner relative to same, and a base which delimits the bottom of the receiving portion and supports the bottom of the mobile terminal. The mounting console is arranged in a compulsory manner in or on the vehicle and its support surface is inclined towards a vehicle driver of the vehicle in such a way that when the mobile terminal is arranged as intended in the mounting console such that an operating and/or display surface of the mounted mobile terminal faces away from the vehicle driver, the operating and/or display surface is not visible to the vehicle driver.

14 Claims, 3 Drawing Sheets

(58) Field of Classification Search
USPC .......................................................... 224/544
See application file for complete search history.

(56) References Cited

U.S. PATENT DOCUMENTS

| | | | |
|---|---|---|---|
| 8,474,832 B2 | 7/2013 | Mersky | |
| 8,922,354 B2 | 12/2014 | Nagara et al. | |
| 9,211,001 B2 | 12/2015 | Negretti | |
| 9,527,456 B2 | 12/2016 | Ackeret et al. | |
| 9,682,664 B2 | 6/2017 | Bettzuege et al. | |
| 10,155,482 B2 | 12/2018 | Corso | |
| 2002/0066392 A1* | 6/2002 | Calam | F16M 11/40 108/33 |
| 2012/0006870 A1* | 1/2012 | Proctor | B60R 11/02 224/275 |
| 2013/0037590 A1* | 2/2013 | Yoon | B60R 11/02 224/483 |
| 2013/0200119 A1* | 8/2013 | Ackeret | B60R 7/04 224/275 |
| 2014/0203770 A1 | 7/2014 | Salter et al. | |

FOREIGN PATENT DOCUMENTS

| | | |
|---|---|---|
| DE | 102013222449 A1 | 5/2014 |
| DE | 102013000138 A1 | 7/2014 |
| DE | 102013001130 A1 | 7/2014 |
| DE | 102014201295 A1 | 7/2014 |
| DE | 102014008810 A1 | 11/2014 |
| DE | 102014010695 A1 | 1/2015 |
| DE | 102013220476 A1 | 4/2015 |
| DE | 102015202254 A1 | 8/2016 |
| DE | 102016102736 A1 | 8/2017 |

* cited by examiner

ASSEMBLY FOR MOUNTING A MOBILE TERMINAL, AND VEHICLE COMPRISING SUCH A MOUNTING ASSEMBLY

This nonprovisional application is a continuation of International Application No. PCT/EP2019/050379, which was filed on Jan. 9, 2019, and which claims priority to German Patent Application No. 10 2018 201 123.0, which was filed in Germany on Jan. 24, 2018, and which are both herein incorporated by reference.

BACKGROUND OF THE INVENTION

Field of the Invention

The present invention relates to an assembly for mounting a mobile terminal in or on a vehicle, and relates to a vehicle comprising such a mounting assembly.

Description of the Background Art

The significance of mobile terminals, such as mobile phones and smartphones and tablet computers, as a central means of communication for customers is constantly increasing. Successful integration of mobile terminals into a vehicle, especially a motor vehicle, is a key element for future customer satisfaction. In addition to the "electrical" integration in particular into the operating and display concept of the vehicle, physical integration, i.e., the storing of the mobile terminal in the vehicle, is also of great importance. The physical integration is subject to a variety of requirements, for example with regard to ergonomic access, positioning in contact-based or contactless electrical charging, cable routing with, e.g., USB connections, the variety of terminal geometries, wired or wireless coupling function with an antenna, mounting/securing during dynamic driving, protection of the display of the terminal and much more.

The visibility of the relevant mobile terminal in a specific storage space while driving may be subject to restrictions for safety reasons. Known visual covers are plug-in solutions, flaps, drawers, partitions and the like.

For example, DE 10 2013 000 138 A1 describes an assembly for securing a mobile device, here referred to as a portable electronic communication device, in particular in a means of transportation, which at least comprises a panel with an opening and a lifting device, the assembly being set up to at least almost completely receive the communication device through the opening and to at least partially eject the same again through the opening. For this purpose, the assembly has a pivotable element which is fixed to a support section for receiving the device. In the ejected state of the device, the same is pivotally arranged on the pivotable element in the direction of a horizontal line in such a way that comfortable viewing of the display of the communication device is possible.

DE 10 2013 001 130 A1 discloses a storage compartment for the interior of a vehicle for receiving objects, such as a cell phone. The storage compartment has a bottom and a peripheral side wall, which form a receiving space. For holding the objects, at least one holding device is provided, which has a windable, tensile-load bearing partition wall and a winding device for winding the partition wall.

DE 10 2014 008 810 A1 shows a charging device for a mobile terminal in a vehicle, comprising a charging unit for inductive energy transmission to the mobile terminal and a holding unit for holding the mobile terminal. The holding unit is designed as a compartment with a first opening for inserting the mobile terminal. At least one holding element for generating a holding force acting on the mobile terminal in the direction of the charging unit is arranged inside the compartment.

DE 10 2016 102 736 A1 describes a center console with a pivotable cover element, which comprises a receiving area for receiving a mobile terminal and a so-called coupling box, wherein the coupling box provides a charging device for charging the mobile terminal, a connection to an outdoor antenna and means for receiving and sending signals.

In general, prior art solutions may serve their intended purpose. Regardless of this, however, they are relatively complicated to manufacture and elaborate in their ergonomic handling, in particular when fitting the specific storage space with the mobile terminal and removing the latter from this space, causing the customer to perceive these as uncomfortable.

US 2013/0 134 282 A1, on the other hand, discloses a holder for an electronic device that can be positioned on a support surface. It is explicitly stated that the holder can be positioned in such a way that the electronic device or its screen and/or the operating elements are visible to a user. The holder holds the electronic device by means of a rear support at an angle which can also be variably adjusted by means of a spacer. The support surface can be a motor vehicle dashboard. Although this solution may ensure ergonomic handling when equipping the holder with an electronic device, such as a mobile terminal, it is not suited for mandatorily restricting the visibility of the operating and/or display surface of the mobile terminal for the vehicle driver for reasons of safety.

DE 10 2015 202 254 A1, which corresponds to U.S. Pat. No. 9,682,664, and discloses a storage compartment in the form of an upwardly open container within, for example, a center console of a vehicle, in particular a motor vehicle, comprising receiving shafts for portable electronic display devices, such as tablet computers, smartphones and the like. The receiving shafts can be oriented vertically or obliquely to the vertical. This document makes no statement regarding the possible visibility of the operating and/or display surface of the respective display device.

DE 20 2007 012 617 U1 discloses a beverage holder in a vehicle, to which an adapter is assigned, which is designed as a replacement insert for the secure mounting and explicitly easy operation of a cell phone. The adapter has a sloping bearing shell. Although this solution may also ensure ergonomic handling when equipping the holder with a cell phone, it is not suited for restricting the visibility of the operating and/or display surface of the mobile terminal for the vehicle driver for reasons of safety.

US 2018/0 001 835 A1 discloses a combination of a cup holder and a cell phone holder within the passenger compartment of a vehicle. The cup holder with the cell phone holder can be rotated or pivoted by 360° so that both the driver and the front passenger can see and access the cell phone well. Although this solution may also ensure ergonomic handling when equipping the holder with a cell phone, it is not suited for restricting the visibility of the operating and/or display surface of the mobile terminal for the vehicle driver for reasons of safety.

US 2012/0 161 406 A1 discloses a holder for a mobile terminal that can be attached to a shopping cart, the holder being configured for a variety of sizes of the terminals. The holder can be mounted in an oblique assembly and/or be designed to be pivoted so as to be able to better see the terminal.

SUMMARY OF THE INVENTION

It is therefore an object of the present invention to provide an assembly as an alternative to the prior art for mounting a mobile terminal in or on a vehicle, which is simple and inexpensive to manufacture and which ensures comfortable use of the mobile terminal when fitting the same in or removing it from a specific storage space. According to a second aspect of the invention, for safety reasons, it is an object thereof to effectively prevent the vehicle driver from becoming distracted as a result of in particular optical signals from a mobile terminal positioned as directed in the the space, and from being encouraged to use the terminal, possibly adversely influencing the operation of the vehicle. According to a third aspect of the invention, it is the object of the invention to provide a vehicle with such a mounting assembly.

Starting from an assembly for mounting a mobile terminal in or on a vehicle, comprising a mounting console which has a receiving portion for the the mobile terminal, wherein the receiving portion has a support surface for the mobile terminal starting from a vertical and being arranged in an inclined manner relative to same, and a base delimiting the bottom of the receiving portion and supporting the bottom of the mobile terminal, which base is oriented orthogonally to the inclined support surface, the object is achieved in that the mounting console is arranged in a compulsory manner in such a way in or on the vehicle and that its support surface is inclined such to a vehicle driver of the vehicle, that when the mobile terminal is arranged as intended in the mounting console such that an operating and/or display surface of the mounted mobile terminal faces away from the vehicle driver, the operating and/or display surface is not visible to the vehicle driver, wherein, however, preferably the operating and/or display surface can be seen by a potential vehicle passenger.

The inclined support surface and the base oriented orthogonally to the same, on which the bottom of the mobile terminal is supported, ensures that the mobile terminal arranged in the mounting console bears stably, i.e., without tilting, against the support surface at least when the vehicle is traveling normally. In addition, this advantageously prevents or at least minimizes the risk that the vehicle driver is distracted while driving as a result of various signals, in particular optical signals, from the mobile terminal, possibly being encouraged to use the the terminal, which would adversely affect the operation of the vehicle.

The mounting console can be arranged in a center console of the vehicle, in particular a motor vehicle, more preferably in a receiving recess of the center console. This assembly of the mounting console in the vehicle advantageously combines simple handling of the mobile terminal when the mobile terminal is arranged in the mounting console and when the terminal is removed from the mounting console with the fact that the operating and/or display surface of the mounted mobile terminal is not visible to the vehicle driver.

In order to effectively prevent the mobile terminal from falling out of the mounting console, particularly when driving dynamically, at least one mounting element is arranged, and/or a mounting geometry of the mounting console is formed, opposite the support surface.

The at least one mounting element and/or the mounting geometry are preferably designed and oriented in such a way that, starting from the bottom of the receiving portion, an upwardly widening receiving area or a receiving compartment or plug-in compartment for the mobile terminal is formed. This has the advantage of simple and largely unimpeded fitting of the mounting console with the mobile terminal.

In order to better protect the mobile terminal from falling out of the mounting console, the mounting console and/or the at least one mounting element are preferably designed in such a way that the mounted mobile terminal is delimited both on its rear wall and its front side as well as towards at least one side edge of the same.

In order to enable convenient removal of the mounted mobile terminal from the mounting console, it can further be provided that the mounting console has or forms an engagement recess in the bottom area thereof, which engagement recess can be accessed manually from the side of the mounting console opposite the support surface. This also results in the knowledge that the bottom of the mounting console does not have to be formed over the entire surface or continuously but can also be designed only in sections or locally in order to support the bottom of the mobile terminal, which is accordingly also covered by the invention.

In order to prevent damage to the mobile terminal and/or rattling noises due to the relative movement of the mobile terminal with respect to the mounting console while driving, the mounting console has an elastomeric coating at least in sections or is formed by an elastomer.

To be able to adapt the support surface of the mounting console in terms of the aforementioned non-visibility of the operating and/or display surface of the mounted mobile terminal for the vehicle driver to different boundary conditions, such as the body size of the vehicle driver, seat height adjustment, etc., and a resulting imaginary line of sight of the vehicle driver, in a further development of the invention the support surface is designed to be adjustable or configurable in its angle of inclination "a", wherein the orthogonal orientation of the base to the support surface is maintained.

According to another aspect of the invention, this also comprises an assembly for mounting a mobile terminal in or on a vehicle, comprising a mounting console which has a receiving portion for the the mobile terminal, wherein the receiving portion has a support surface starting from a vertical and arranged at an angle thereto, on which the mobile terminal bears in the receiving portion with its rear wall when the terminal is arranged as intended, and has a base which delimits the bottom of the receiving portion and supports the bottom of the mobile terminal. It is advantageously provided that as a result of a compulsory assembly of the mounting console in the vehicle and the intended fitting of the mobile terminal in the mounting console, a front side of the mobile terminal having an operating and/or display surface is arranged inclined in such a way that no viewing condition between one of the light beams emanating from the operating and/or display surface and a line of sight of a vehicle driver is geometrically fulfilled, but preferably a viewing condition between a light beam emanating from the operating and/or display surface and a line of sight of a possible vehicle passenger is geometrically fulfilled.

This advantageously prevents or at least minimizes the risk that the vehicle driver is distracted while driving as a result of optical signals from the mobile terminal arranged as intended in the mounting console and might be encouraged to handle the the terminal in a manner which adversely affects the driving of the vehicle. A light beam emanating from the control and/or display surface is therefore not emitted in the direction of the driver's line of sight. Expressed even more simply, this means that the mobile terminal is always positioned or plugged into the mounting console in such a way that the control and/or display surface is not visible to the vehicle driver.

The invention further relates to a vehicle having an assembly of the type described above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
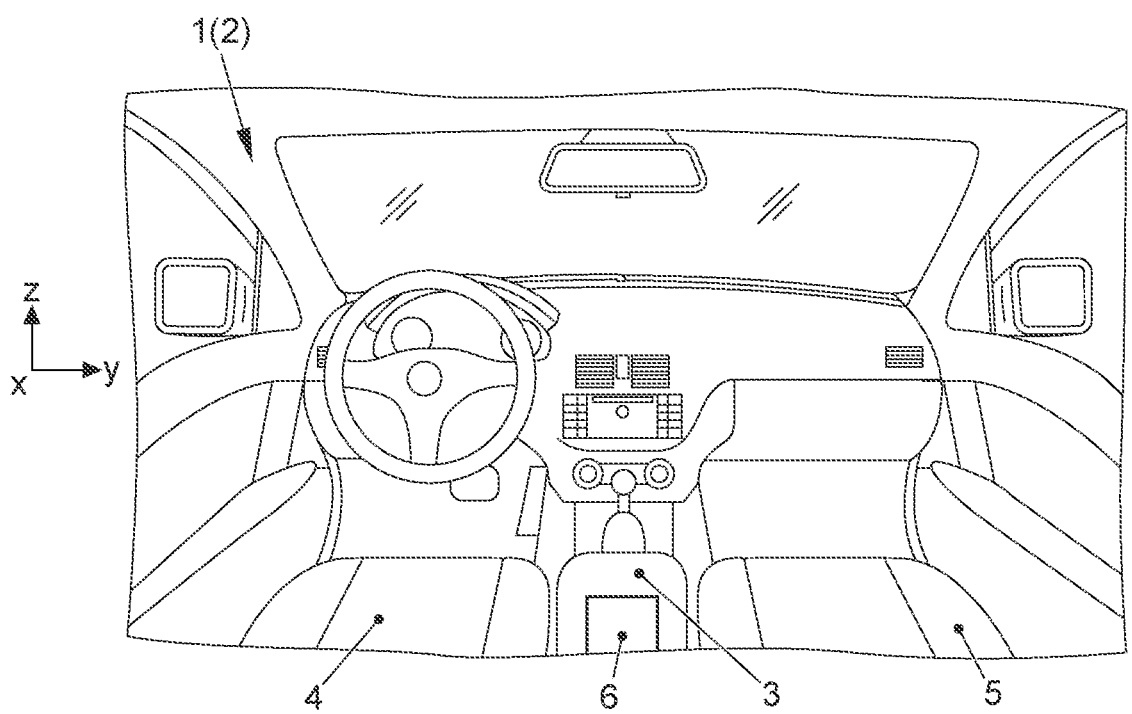
FIG. 1 shows a section of a passenger compartment of a motor vehicle with a view of a center console of the passenger compartment.

FIG. 1 shows the interior of the passenger compartment 1 of a vehicle 2, in the present case a motor vehicle comprising a center console 3, which center console 3 is arranged between a driver seat 4 and a passenger seat 5. The center console 3 has a receiving recess 6 for objects to be carried in the vehicle 2. In addition, the vehicle 2 has an assembly 7 for mounting a mobile terminal 8. A mobile terminal 8 is in general understood to be a device that is portable and can be used in a mobile manner without great physical effort due to its size and its weight, which is designed for mobile, off-grid data, voice and/or video communication and/or navigation. In particular, mobile terminals 8 are cell phones, such as smartphones, as well as tablet computers, personal digital assistants (PDAs) and GPS devices (GPS=Global Positioning System), Notebooks, Netbooks and the like.

Figure 2:
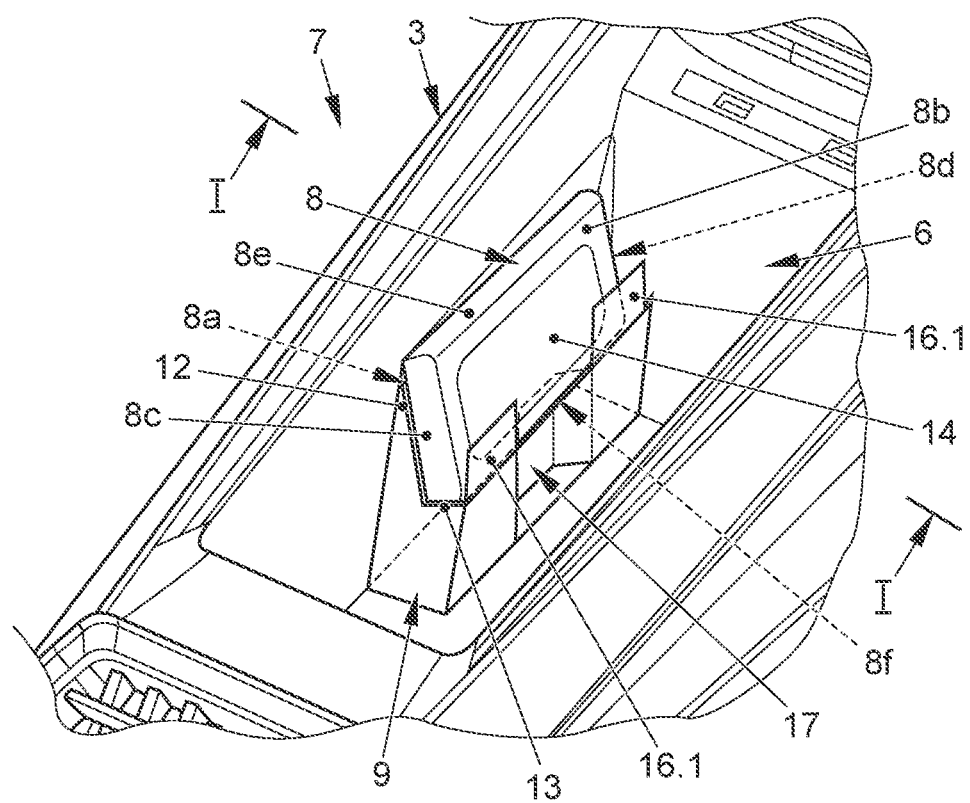
FIG. 2 shows a detailed illustration of the center console according to FIG. 1, comprising a mounting assembly according to the invention in accordance with an exemplary embodiment of the invention.
Figure 3:
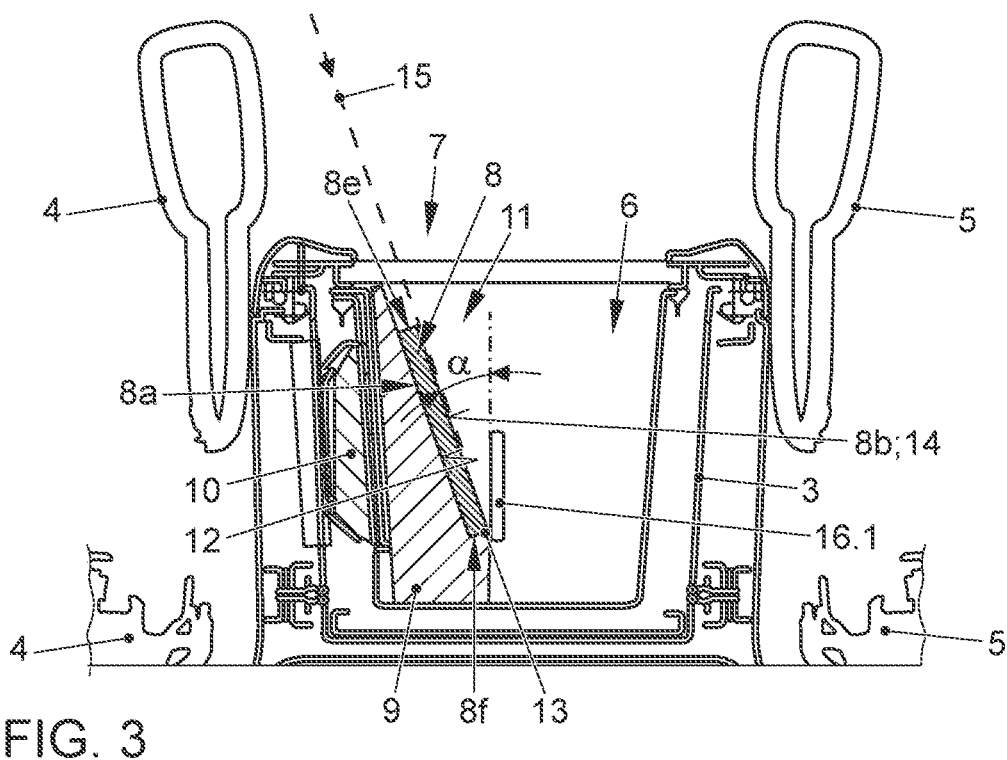
FIG. 3 shows the section "I-I" of FIG. 2.
Figure 5:
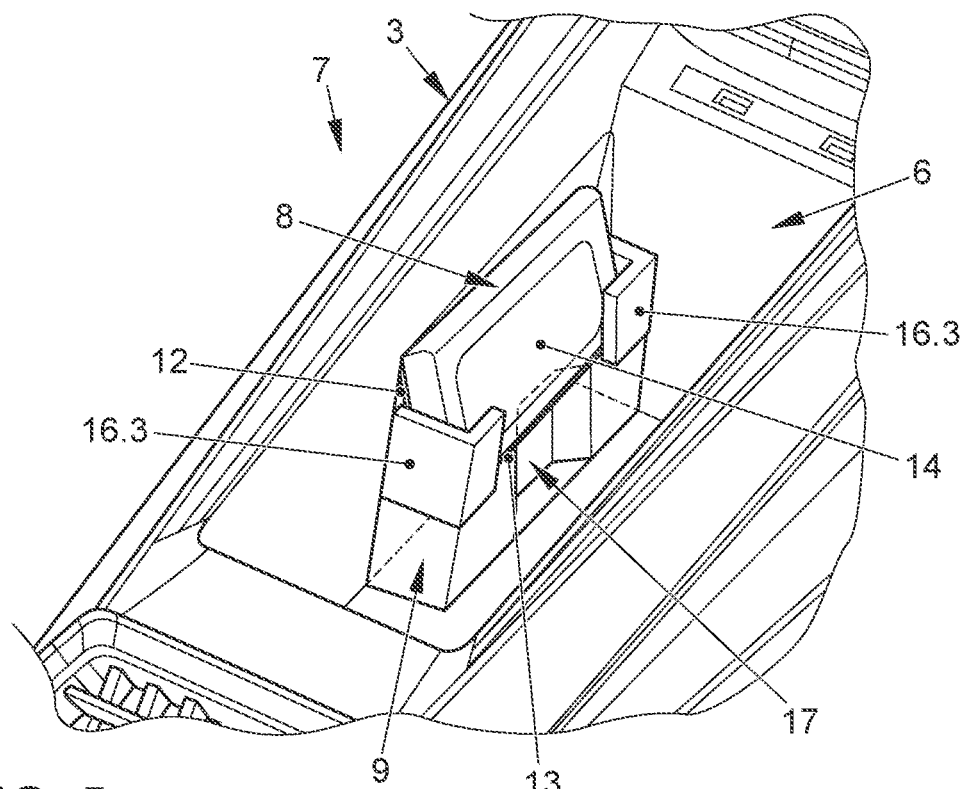
FIG. 5 shows the mounting assembly according to an exemplary embodiment of the invention.

With regard to FIG. 2, the assembly 7 for mounting the relevant mobile terminal 8 according to this preferred exemplary embodiment is formed by a mounting console 9 for mounting the mobile terminal 8, shown schematically here in FIG. 5, which mounting console 9 is arranged within the receiving recess 6 of the center console 3 immediately adjacent to a so-called coupling box 10 (cf. FIG. 3). The coupling box 10 preferably provides a charging device for electrically charging the mobile terminal 8, more preferably effected by an inductive coupling function, a connection of the mobile terminal 8 to an external antenna and means for receiving and transmitting signals. The mounting console 9 is preferably made of a plastic and is formed by a molded body which defines a receiving portion 11 for the mobile terminal 8.

The receiving portion 11 has a support surface 12 for the mobile terminal 8 starting from a vertical and being arranged in an inclined manner relative to same, and a base 13 which delimits the bottom of the receiving portion 11 and supports the bottom of the mobile terminal 8. The angle of inclination "a" of the support surface 12 is preferably selected to be between 15° and 25° and, according to this exemplary embodiment, is approximately 20°. The support surface 12 of the mounting console 9 is arranged adjacent to the coupling box 10, which results in a small spacing between the mobile terminal 8 and the coupling box 10, which in turn has an advantageous effect on the charging behavior for electrically charging the mobile terminal 8 due to inductive coupling.

The mobile terminal 8 has a rear wall 8a, a front side 8b comprising an operating and display surface 14, in particular a display, preferably a touch display, and, depending on the individual assembly of the mobile terminal 8 in the mounting console 9, has two side edges 8c, 8d and an upper edge 8e and a lower edge 8f. The mobile terminal 8 is supported by the lower edge 8f on the base 13 and bears with its rear wall 8a on the support surface 12. In this way, impairment of or damage to the control and display surface 14 by the mounting console 9 is avoided.

As can also be seen from FIGS. 2 and 3, the base 13 is oriented orthogonally to the inclined support surface 12. As already shown above, the inclined support surface 12 and the base 13 on which the bottom of the mobile terminal 8 is supported, oriented orthogonally to the support surface, ensure that the mobile terminal 8 arranged in the mounting console 9 is stable at least during normal travel, i.e., bears on the support surface 12 without tilting.

As can also be seen from FIGS. 2 and 3, according to this exemplary embodiment the mounting console 9 is arranged in the receiving recess 6 of the center console 3 in a compulsory manner such that the mounted mobile terminal 8 extends in the vehicle longitudinal direction (X direction), and its operating and display surface 14 faces away from the driver's seat 4 or a vehicle driver sitting on the same and towards the passenger seat 5 or towards a passenger sitting on the same. In addition, the mounting console 9 is formed with its support surface 12 inclined towards the driver seat 4 or the vehicle driver in such a way that the operating and display surface 14 of the mobile terminal 8 arranged in the mounting console 9 is not visible to the vehicle driver but can be seen by a possible passenger. With regard to this, FIG. 3 first schematically shows a resulting imaginary line of sight 15 from a vehicle driver, who is positioned on the driver seat 4, which line of sight 15 indicates that the operating and display surface 14 of the mobile terminal 8 is not visible to the vehicle driver.

In other words, as a result of a compulsory assembly of the mounting console 9 in the vehicle 2 and the intended assembly of the mobile terminal 8 in the mounting console 9, the front side 8b of the mobile terminal 8 having the operating and/or display surface 14 is arranged at an incline in such a way that a viewing condition between a light beam and emanating from the operating and/or display surface 14 and a line of sight of a passenger is geometrically fulfilled, but a viewing condition between a light beam and emanating from the operating and/or display surface 14 and the line of sight 15 from the vehicle driver, is not geometrically fulfilled. A light beam emanating from the operating and/or display surface 14 is thus not necessarily emitted in the direction of the line of sight 15 of the vehicle driver, but rather only in the direction of a possible passenger.

In order to effectively prevent the mobile terminal 8 from falling out of the mounting console 9, in particular when driving dynamically, two mounting elements 16.1 are provided according to FIGS. 2 and 3, which are arranged at a distance from one another opposite the support surface 12 and are fastened to the mounting console 9. The joint connection between the mounting console 9 and the mounting elements 16.1 can be of a positive, non-positive and/or cohesive type. The mounting elements 16.1 are plate-shaped in this case and oriented in such a way that, starting from the base 13 of the receiving portion 11, an upwardly widening receiving area or an upwardly widening receiving compartment or a plug-in compartment for the mobile terminal 8 is formed. This has the advantage of simple and largely unimpeded mounting of the mounting console 9 with the mobile terminal 8.

In the area of the spacing between the two mounting elements 16, an engagement recess 17 is formed in the bottom region of the mounting console 9, which engagement recess 17 can be manually accessed from the side of the mounting console 9 opposite the support surface 12.

This enables comfortable removal of the mounted mobile terminal 8 from the mounting console 9 by, for example, the vehicle driver reaching over the mounted mobile terminal 8 into the engagement recess 17 and under the mobile terminal 8 overarching the latter, thus being able to lift the mobile terminal out of the receiving portion 11. According to this exemplary embodiment, the base 13 is therefore not formed over the entire surface.

As already shown above, the invention accordingly also comprises a base 13 which is designed both over the entire surface or continuously or only locally, i.e., not over the entire surface or not continuously. For example, on the bottom side, the mounted mobile terminal 8 may only be supported in end sections thereof. The base 13 can, e.g., be formed solely by one, two or a plurality of rod elements. The same applies to the support surface 12 of the mounting console 9. This also does not have to be full-surface or continuous, but can also be formed, for example, solely by one, two or a plurality of rod elements, which extend at a distance from one another along the mobile terminal 8 and support the latter on the back wall. The terms base 13 and support surface 12 are therefore not limited to large-sized support surfaces, but also comprise small-surface support including line or point-shaped contacting of the mounted mobile terminal 8 by the support, if the support, for example with regard to line-shaped contacting, are formed by round profile bars.

In order to prevent damage to the mobile terminal 8 and/or rattling noises while driving, at least in sections, i.e. in relevant areas where there is contact with the mobile terminal 8, the mounting console 9 has an elastomeric coating or is formed by an elastomer. The plastic coating can be sprayed onto the contact areas, for example, by a plastic injection molding process known per se. In addition, the coating can also be effected, for example, by flocking the contact areas with in particular plastic fibers, also referred to as flock fibers, by applying adhesive to the contact areas and then applying the flock fibers. The flock fibers are anchored in the plastic at one end and are then subjected to an electrical charge. The charge causes the flock fibers to be vertically aligned in this field and after drying or setting the glue, to be fixed in the glue.

In order to be able to adapt the support surface 12 of the mounting console 9 and thus the line of sight 15, in particular with regard to the aforementioned non-visibility of the operating and/or display surface 14 of the mounted mobile terminal 8 for the vehicle driver, to different boundary conditions, such as the body size of the vehicle driver, seat height adjustment, etc., the support surface 12 can be designed to be adjustable in its angle of incidence, wherein the orthogonal orientation of the base 13 to the support surface 12 is maintained. This means that the support surface 12, together with the base 13 arranged at right angles to it, preferably forms a structural unit which is pivotably attached and fixable to a base element of the mounting console 9 at the selected incidence angle.

Figure 4:
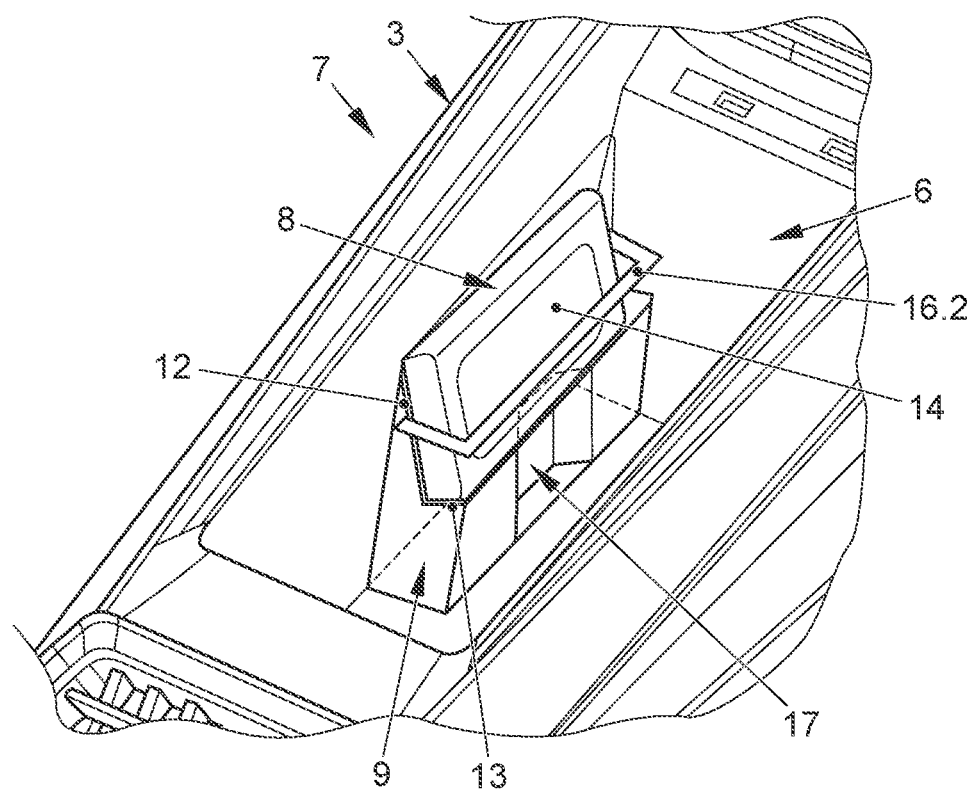
FIG. 4 shows the mounting assembly according to an exemplary embodiment of the invention.

FIG. 4 shows a second embodiment variant of an assembly 7, designed according to the invention, for mounting a mobile terminal 8 in a vehicle 2, wherein parts with the same function are designated with the same reference numbers as in the previous drawing figures, so that these can be explained by reference being made to the above description of the first embodiment version. This second embodiment version of the invention essentially differs from the first embodiment version in that the mounted mobile terminal 8 is even better prevented from falling out of the mounting console 9 in that a mounting element 16.2 is designed in such a way that the mounted mobile terminal 8 is delimited both on its rear wall 8a and its front side 8b as well as on its side edges 8c, 8d. In the present case, the mounting element 16.2 is formed by a U-profile, which is connected at both ends to the mounting console 9 in the area of the support surface 12. The joint connection between the mounting console 9 and the mounting element 16.2 can be of a positive, non-positive and/or cohesive type. In combination with the support surface 12, a peripheral mounting frame is formed, so to speak. The formed mounting frame is dimensioned in such a way that, based on the first embodiment of the invention, the mounting console 9 forms an upwardly widening receiving area or an upwardly widening receiving compartment or a plug-in compartment for comfortably fitting the mounting console 9 with the mobile terminal 8.

FIG. 5 shows an embodiment version of an assembly 7 designed according to the invention for mounting a mobile terminal 8 in a vehicle 2, wherein the same function parts are designated with the same reference numbers as in the previous drawing figures, so that these can be explained by reference being made to the above description of the first embodiment version of the invention. This third embodiment version of the invention essentially differs in particular from the previously described second embodiment version in that instead of a peripheral mounting element 16.2, a mounting element 16.3, which is interrupted in the area of the engagement recess 17, or two mounting elements 16.3 each limiting a side edge 8c, 8d and a section of the front side 8b of the mobile terminal 8 is/are provided. The joint connection between the mounting console 9 and the mounting elements 16.3 can be of a positive, non-positive and/or cohesive type. The mounting elements 16.3 are dimensioned such that, based on the embodiment versions of the invention described above, they form with the mounting console 9 an upwardly widening receiving area or an upwardly widening receiving compartment or a plug-in compartment for conveniently fitting the mounting console 9 with the mobile terminal 8.

Figure 6:
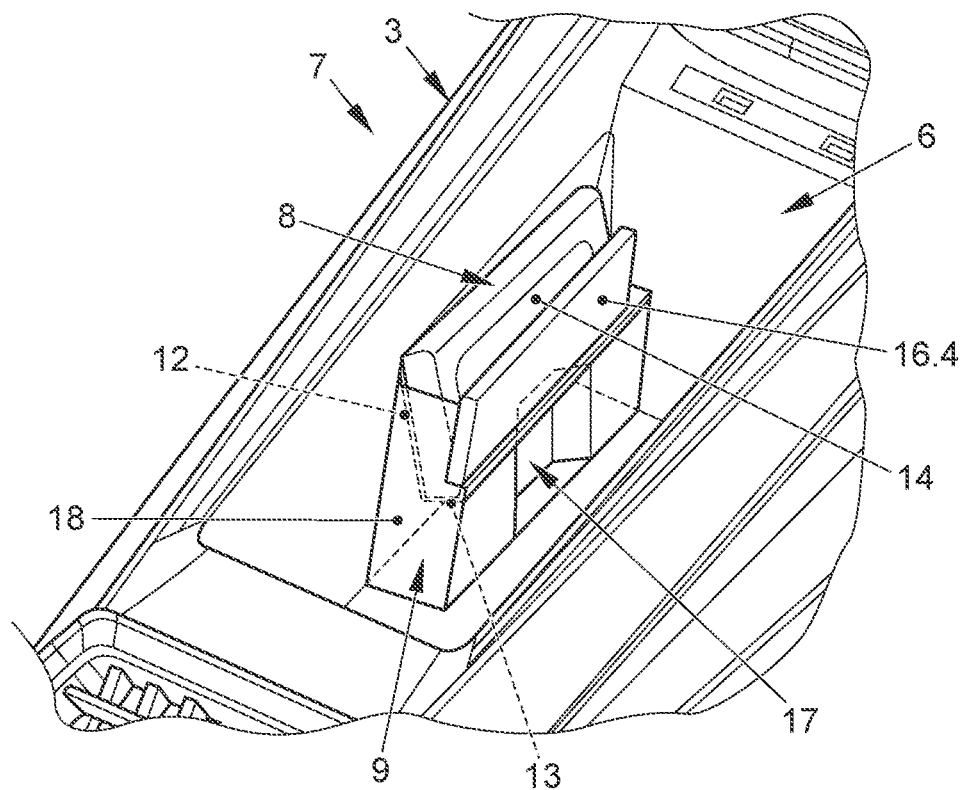
FIG. 6 shows the mounting assembly according to an exemplary embodiment of the invention.

FIG. 6 shows an embodiment version of an assembly 7 designed according to the invention for mounting a mobile terminal 8 in a vehicle 2, wherein the parts functioning the same are designated with the same reference numbers as in the drawing figures above, so that these can be explained by reference being made to the above description of the first embodiment version of the invention. This fourth embodiment version of the invention essentially differs from the previously described embodiment versions in that the mounting console 9 has two mounting geometries 18 which are formed in one piece with the latter, each delimiting one of the side edges 8c, 8d of the mobile terminal 8. In addition, a mounting element 16.4 is provided which, connecting the mounting geometries 18 to one another, delimits the front side 8c of the mobile terminal 8. This mounting element 16.4 is preferably formed from an elastomer, in particular from an elastomeric plastic. The joint connection between the mounting console 9 and the mounting element 16.4 can be of a positive, non-positive and/or cohesive type. In addition, the mounting element 16.4 can be formed from plastic, for example, by a two-component plastic injection molding process in the manufacture of the mounting console 9. The mounting element 16.4 is dimensioned in such a way that, based on the embodiment versions of the invention described above, this forms an upwardly widening receiving area or an upwardly widening receiving compartment or a plug-in compartment with the mounting console 9 for conveniently fitting the mounting console 9 with the mobile terminal 8.

However, the invention is not limited to the exemplary mounting elements 16.1, 16.2, 16.3, 16.4 and mounting geometries 18 described above, but rather includes any suitable configuration with mounting elements 16.1, 16.2, 16.3, 16.4 and mounting geometries 18 for securing the mobile terminal 8 when the vehicle 2 is traveling in particular in a dynamic manner. For example, it can be provided that the above-described mounting elements 16.1, 16.2, 16.3, 16.4 are replaced by mounting geometries integrally formed with the mounting console 9 and the above-described mounting geometries 18 are replaced by mounting elements fixed on the mounting console 9. In addition, the invention is not limited to a vehicle 2 in the form of a motor vehicle comprising a mounting console 9 arranged in particular in a center console 9 but rather includes any vehicle 2 suitable for being equipped with an assembly 7 of the type according to the invention. For example, an aircraft, a watercraft, a motorcycle, a bicycle, a Pedelec or the like can also have an assembly 7 of the type according to the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An assembly for mounting a mobile terminal in or on a vehicle, the assembly comprising:
   a mounting console that is directly mounted on or in a center console of the vehicle, the mounting console having a receiving portion for the mobile terminal, the receiving portion comprising a support surface for the mobile terminal that is inclined with respect to a vertical direction; and
   the mounting console having a base, which delimits a bottom of the receiving portion and supports a bottom of the mobile terminal and which is orthogonally oriented to the support surface,
   wherein the base and the support surface are immovable with respect to remaining portions of the mounting console, such that in a fully mounted state of the mounting console on or in the center console of the vehicle, an orientation of the base and an orientation of the support surface are unchangeable, and
   wherein the mounting console is mounted in or on the center console of the vehicle in a compulsory manner in which the support surface is inclined to and faces away from a vehicle driver of the vehicle, such that in an intended mounting of the mobile terminal in the mounting console, an operating and/or a display surface of the mobile terminal faces away from the vehicle driver so that the operating and/or display surface is not visible to the vehicle driver.

2. The assembly according to claim 1, wherein, with the intended mounting of the mobile terminal in the mounting console, the operating and/or display surface is adapted to be seen by a passenger of the vehicle.

3. The assembly according to claim 1, wherein at least one mounting element is arranged and/or a mounting geometry of the mounting console for the mobile terminal is/are formed opposite the support surface.

4. The assembly according to claim 3, wherein the at least one mounting element and/or the mounting geometry are designed and oriented such that, starting from the base of the receiving portion, an upwardly widening receiving area for the mobile terminal is formed.

5. The assembly according to claim 3, wherein the mounting console and/or the at least one mounting element are designed such that the mobile terminal, once mounted, is delimited both on a rear wall, front side and on at least one side edge of the mobile terminal.

6. The assembly according to claim 1, wherein the base of the mounting console has an engagement recess for removing the mobile terminal, the engagement recess being accessed manually from a side of the mounting console opposite the support surface.

7. The assembly according to claim 1, wherein the mounting console has an elastomeric coating at least in sections or is formed by an elastomer.

8. The assembly according to claim 1, wherein an inclination angle "$\alpha$" of the support surface is adjustable.

9. An assembly for mounting a mobile terminal in or on a vehicle, the assembly comprising:
   a mounting console that is directly mounted on or in a canter console of the vehicle, the mounting console having a receiving portion for the mobile terminal, the receiving portion having a support surface that is inclined with respect to a vertical direction, wherein a rear wall of the mobile terminal bears against the support surface in the receiving portion when the mobile terminal is mounted in the mounting console as intended; and
   the mounting console having a base that delimits a bottom of the receiving portion and supports a bottom of the mobile terminal,
   wherein the base and the support surface are immovable with respect to remaining portions of the mounting console, such that in a fully mounted state of the mounting console on or in the center console of the vehicle, an orientation of the base and an orientation of the support surface are unchangeable, and
   wherein as a result of a compulsory mounting of the mounting console in or on the center console of the vehicle in which the support surface is inclined to and faces away from a vehicle driver of the vehicle and an intended mounting of the mobile terminal in the mounting console, a front side of the mobile terminal, which has an operating and/or display surface, is arranged inclined in such a manner that no viewing condition between a light beam emitted from the operating and/or display surface and a line of sight of a vehicle driver is geometrically fulfilled.

10. The assembly according to claim 9, wherein, with the intended mounting of the mobile terminal in the mounting console, the front side of the mobile terminal, having the operating and/or display surface, is arranged inclined in such a manner that a viewing condition between the light beam emanating from the operating and/or display surface and a line of sight of a vehicle passenger is fulfilled geometrically.

11. A vehicle comprising an assembly according to claim 1.

12. The assembly according to claim 1, wherein the mounting console is mounted in or on the center console of the vehicle in the compulsory manner, such that a position of the support surface and a position of the base, with respect to the mounting console, are unchangeable.

13. The assembly according to claim 9, wherein the compulsory mounting of the mounting console in or on the center console of the vehicle is such that a position of the support surface and a position of the base, with respect to the mounting console, are unchangeable.

14. An assembly for mounting a mobile terminal in or on a vehicle, the assembly comprising:
  a center console;
  a mounting console that is directly mounted on or in the center console, the mounting console having a receiving portion for the mobile terminal, the receiving portion comprising a support surface for the mobile terminal that is inclined with respect to a vertical direction; and
  the mounting console having a base, which delimits a bottom of the receiving portion and supports a bottom of the mobile terminal and which is orthogonally oriented to the support surface,
  wherein the base and the support surface are immovable with respect to remaining portions of the mounting console, such that in a fully mounted state of the mounting console on or in the center console of the vehicle, an orientation of the base and an orientation of the support surface are unchangeable, and
  wherein the mounting console is mounted in or on the center console of the vehicle in a compulsory manner in which the support surface is inclined to and faces away from a vehicle driver of the vehicle, such that in an intended mounting of the mobile terminal in the mounting console, an operating and/or a display surface of the mobile terminal faces away from the vehicle driver so that the operating and/or display surface is not visible to the vehicle driver.

* * * * *